United States Patent
Tanabe

(10) Patent No.: US 6,965,425 B2
(45) Date of Patent: Nov. 15, 2005

(54) SUPPLYING APPARATUS FOR RECORDING MATERIAL

(75) Inventor: Tsuyoshi Tanabe, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/811,958

(22) Filed: Mar. 30, 2004

(65) Prior Publication Data

US 2004/0190894 A1 Sep. 30, 2004

(30) Foreign Application Priority Data

Mar. 31, 2003 (JP) .............................. 2003-097013

(51) Int. Cl.⁷ .......................... G03B 27/58; G03B 27/32
(52) U.S. Cl. ........................ 355/27; 355/29; 355/40; 355/72; 396/599; 396/612
(58) Field of Search .......................... 355/27–29, 40, 355/41, 72, 75; 396/598, 599, 612

(56) References Cited

U.S. PATENT DOCUMENTS 6,146,029 A * 11/2000 Oka et al. .................... 396/612

6,490,024 B1 * 12/2002 Ohno .......................... 355/27

FOREIGN PATENT DOCUMENTS

| JP | 06-347914 A | 12/1994 |
| JP | 08-314022 A | 11/1996 |
| JP | 11-202418 A | 7/1999 |
| JP | 2001-056511 A | 2/2001 |

* cited by examiner

Primary Examiner—D. Rutledge
(74) Attorney, Agent, or Firm—Sughrue Mion, PLLC

(57) ABSTRACT

Magazines containing a photographic paper roll are set to first and second magazine stands respectively. Each of the magazine stands is provided with a unit for positioning the magazine. After sliding the magazine in a width direction of the photographic paper, the magazine stand is positioned so as to make a multi-row pitch optimum in accordance with a width of the photographic paper. The magazine stand is provided with a cutter to cut the photographic paper in a print size. The photographic papers advanced from the first and second magazines are sent to passages and are gathered in multi rows at a passage concourse. Devices for arranging and rearranging the photographic paper are unnecessary so that a structure is simplified.

14 Claims, 7 Drawing Sheets

SUPPLYING APPARATUS FOR RECORDING MATERIAL

BACKGROUND OF THE INVENTION

1. Field of the Invention

The present invention relates to a supplying apparatus for feeding plural rows of recording material to a recording apparatus.

2. Description of the Related Art

A magazine is set in a photosensitive-material processing apparatus of a printer processor or the like used in a photofinishing laboratory. The magazine contains a rollform photosensitive material being as an image recording material. Various types of the magazines are provided in accordance with widths of the photosensitive material, and the magazines are used so as to be changed in accordance with a print size and so forth. The photosensitive material advanced from the magazine is cut in a predetermined length and is carried to an exposing section, a developing section, a drying section and a stacking section in this order. In the exposing section, an image is printed on the basis of image data obtained by reading the image, which is recorded on a photo film and so forth. In the developing section, the exposed photosensitive material is developed. By the way, the stacking section is provided as need arises. The photosensitive-material processing apparatus usually takes a lot of time for a developing process rather than an exposing process. Consequently, when the photosensitive material is successively exposed and developed, the developing process lags behind the exposing process. In other words, developing ability determines processing ability of the whole apparatus.

In order to improve the developing ability, multi-row feeding of the photosensitive material is performed. For instance, the multi-row feeding is performed such that the photosensitive-material processing apparatus is loaded with the plural magazines, which are disposed in parallel and contain the narrow photosensitive material (see Japanese Patent Laid-Open Publication No. 8-314022). In another way, plural photosensitive materials attached to a spool of the same magazine are advanced at once and are cut by a single cutter (see Japanese Patent Laid-Open Publication Nos. 2001-56511 and 11-202418). In the other way, the multi-row feeding is performed such that the wide photosensitive material is exposed so as to print some images and is cut in a longitudinal direction and in a width direction (see Japanese Patent Laid-Open Publication No. 11-202418). In the other way, the multi-row feeding is performed by moving a cylinder attached to a magazine as a sorting device (see Japanese Patent Laid-Open Publication No. 6-347914, which is a counterpart of Japanese Patent No. 2872231).

In the above Publication No. 8-314022, however, when the multi-row feeding is performed, it is necessary to prepare the magazines in accordance with the widths of the photosensitive materials. Further, it is also necessary to prepare driving mechanisms corresponding to the magazines. Thus, a structure of the apparatus becomes complicated so that it takes costs. In the above Publication Nos. 2001-56511 and 11-202418, since the photosensitive materials are carried by a single driving unit and are cut by a single cutter, it is impossible to cut the photosensitive materials at different lengths. In a case it is required to print only one image, it is impossible to perform single-row feeding in that any one of the attached photosensitive materials is advanced. In the above Publication No. 6-347914, the magazine containing the photosensitive material has a considerable weight so that a great load of inertia is caused at the time of stoppage after a reciprocating operation performed by the cylinder. Accordingly, it is difficult to stably set the magazine to a stop position with accuracy. Moreover, it is difficult to perform high-seed printing, since the magazine is reciprocated at the time of the multi-row feeding. Further, insofar as the sorting device is necessary, a rearranging device is also necessary to rearrange photographic papers in an exposure order. The structure of the apparatus becomes more complicated.

SUMMARY OF THE INVENTION

In view of the foregoing, it is a primary object of the present invention to provide an apparatus for supplying a recording material in which various kinds of the recording materials are properly fed in a multi-row state with a simple structure.

In order to achieve the above and other objects, the apparatus for supplying the recording material according to the present invention comprises magazines, conveyor and positioner. The magazine contains the recording material. The conveyor carries the recording material from the magazine. The respective magazines or the respective recording materials contained therein are positioned by the positioner such that positions thereof are changeable in a width direction of the recording material, which crosses a carrying direction. The magazines or the recording materials contained therein are set such that the recording materials are prevented from overlapping with each other in the width direction perpendicular to the carrying direction. It is preferable that the positioner is constituted of a magazine stand and a magazine-stand fixer. The magazine standholds the magazine and is fixed by the magazine-stand fixer such that a position thereof is changeable in the width direction of the recording material. The recording material contained in the magazine is a single recording-material roll taken up in a roll form. It is preferable that the magazine is constituted of a magazine case, a rotary member and a fixing member. The rotary member is inserted into the recording-material roll rotatably contained in the magazine case. The fixing member is attached to the rotary member such that a position thereof is changeable in an axis direction of the rotary member. The recording-material roll is fixed to the rotary member by the fixing member. It is preferable to provide a cutter for cutting the recording material, which is forwarded from the magazine, in the width direction.

In a preferred embodiment, the apparatus for supplying the recording material includes a detecting unit and a judging unit. The detecting unit detects an amount of the changed position of the magazine or the recording material contained therein. The judging unit judges whether or not the recording materials forwarded from the respective magazines interfere with each other in the conveyor, on the basis of the changed-position amount and information concerning the widths of the recording materials. Further, it is preferable to provide a warning unit for announcing a trouble in response to the interference judgment made by the judging unit.

According to the present invention, the multi-row feeding of the recording materials having different width sizes may be performed at optional intervals regardless of sizes of a magazine body and a magazine driving unit. A distance between the respective recording materials is prevented from too widening. Since the warning unit is provided, the recording materials are prevented from overlapping with each other on a passage and from protruding out of the passage so that recording may be properly performed in multi-row feeding. Further, the multi-row feeding is performed from when the recording materials are supplied from the magazines so that units for arranging and rearranging the recording material are unnecessary. Thus, its structure is simplified.

BRIEF DESCRIPTION OF THE DRAWINGS

The above objects and advantages of the present invention will become apparent from the following detailed description of the preferred embodiments of the invention when read in conjunction with the accompanying drawings, in which.

DETAILED DESCRIPTION OF THE PREFERRED EMBODIMENT(S)

Figure 1:
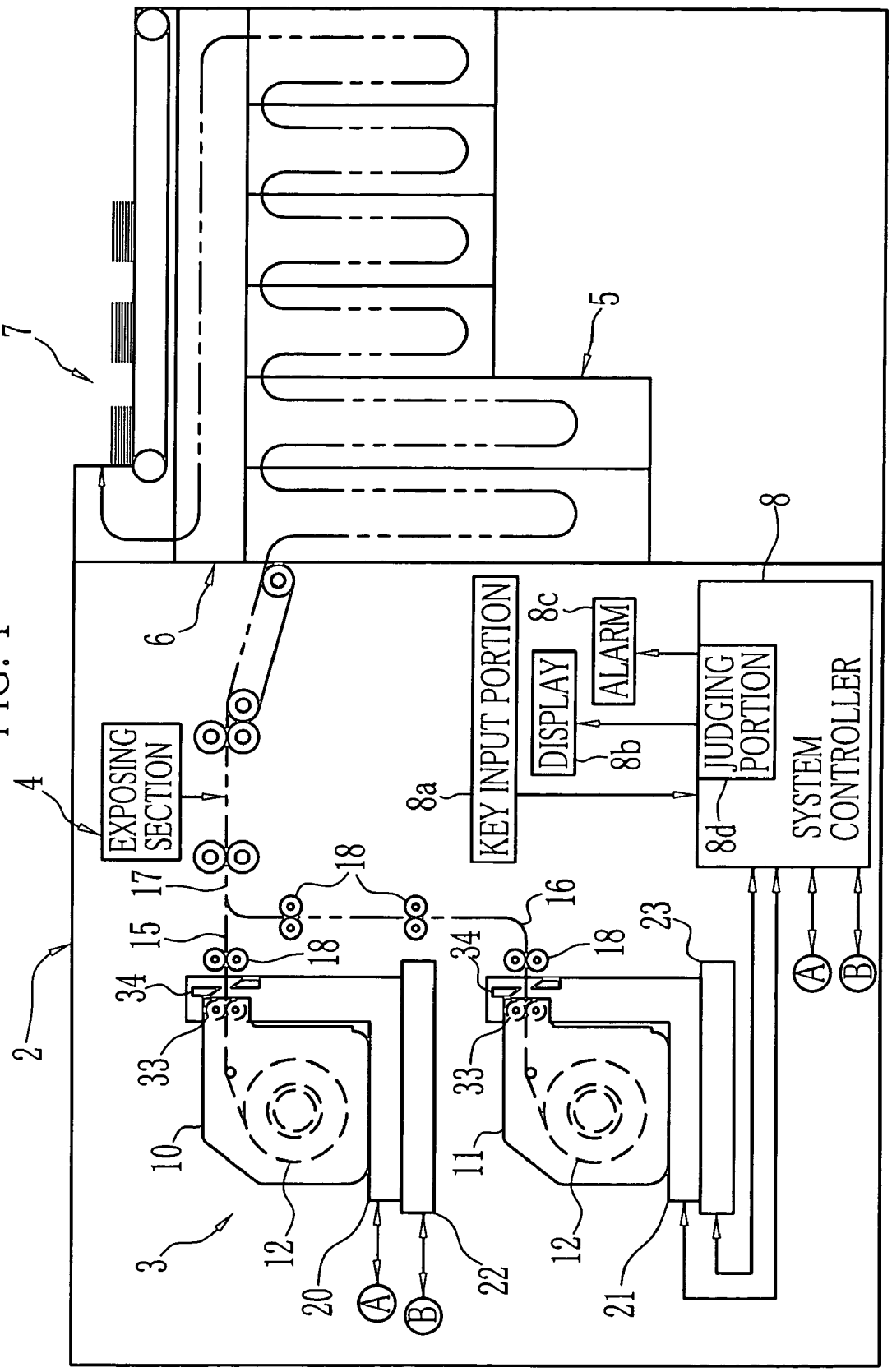
FIG. 1 is a schematic illustration showing a printer processor according to the present invention.

FIG. 1 schematically shows a printer processor. The printer processor 2 is constituted of a supplying section 3, an exposing section 4, a developing section 5, a drying section 6, a stacking section 7 and a system controller 8. The respective sections 3 to 7 of the printer processor 2 are controlled by the system controller 8 provided with a key input portion 8a, a display 8b, an alarm 8c and so forth.

The supplying section 3 comprises first and second magazines 10 and 11. Each of the magazines 10 and 11 contains a photographic paper roll 12. In accordance with a print size, the photographic paper roll 12 is drawn and cut in a predetermined length to produce a sheet-form photographic paper 13 (see FIG. 2). The photographic papers 13 are advanced in a single row along each of a first passage 15 and a second passage 16. The rows of the photographic papers 13 are shifted by a predetermined offset amount in a direction crossing a feeding direction of the photographic paper, such as described later. The photographic papers are arranged in two rows at a passage concourse 17, and are forwarded to the exposure section 4 in this two-row state. Each of the passages 15 to 17 is formed so as to have a width being capable of carrying the photographic papers, which have various widths and are allowed to be contained in the magazines 10 and 11. For example, when the maximum width of the photographic papers to be contained in the magazine is 12 inches (=305 mm), the widths of the passages 15 to 17 are proper to be about 330 mm. In the case of this passage width, it is possible to carry the photographic papers having a 6-inch (=152 mm) width, in two rows. It is needless to say that the passage width may be properly determined in accordance with the maximum width of the photographic papers and the width of the photographic papers to be carried in plural rows. The above-noted width is not exclusive.

The exposing section 4 performs scanning exposure for the photographic papers 13, which are carried in plural rows, on the basis of image data to record a latent image thereon. In the developing section 5, processes of coloring, developing, bleach-fixing and washing are performed for the exposed photographic paper. Successively, the exposed photographic paper is dried in the drying section 6. The dried photographic papers are carried to the stacking section 7, keeping the plural-row state. And then, the photographic papers are assorted every print order and are discharged.

Figure 2:
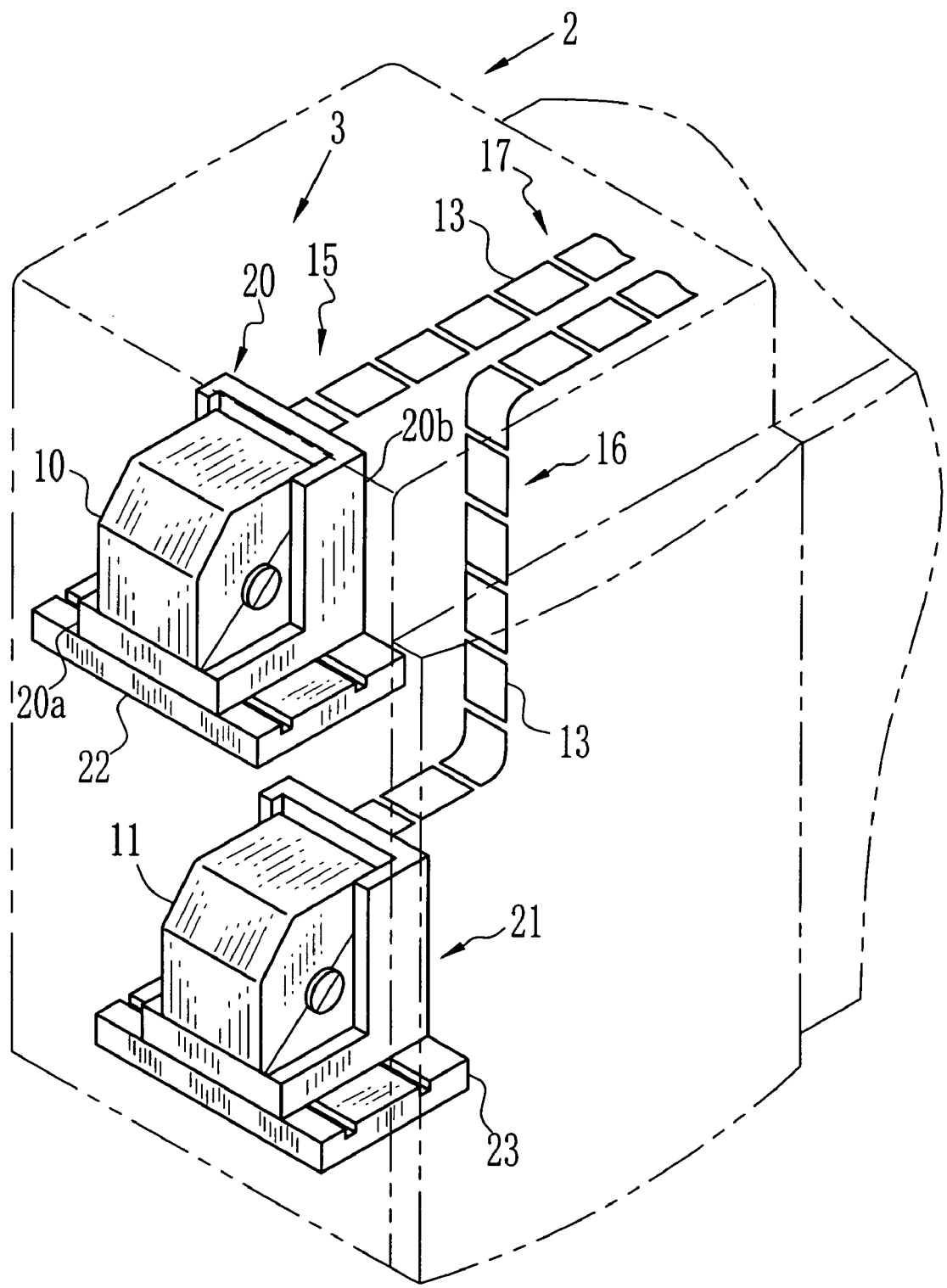
FIG. 2 is a perspective view showing arrangement of magazines and magazine stands.

As shown in FIG. 2, the supplying section 3 is constituted of first and second magazine stands 20 and 21, magazine-stand positioning units 22 and 23, the first passage 15, the second passage 16, and the passage concourse 17. The first and second passages 15 and 16 are arranged such that the centers thereof in the width direction coincide with each other in a vertical direction. The respective passages 15 to 17 comprise a conveyor roller 18 (see FIG. 1) and a guide plate, which is not shown. The magazines 10 and 11 are set to the magazine stands 20 and 21 respectively.

Figure 3:
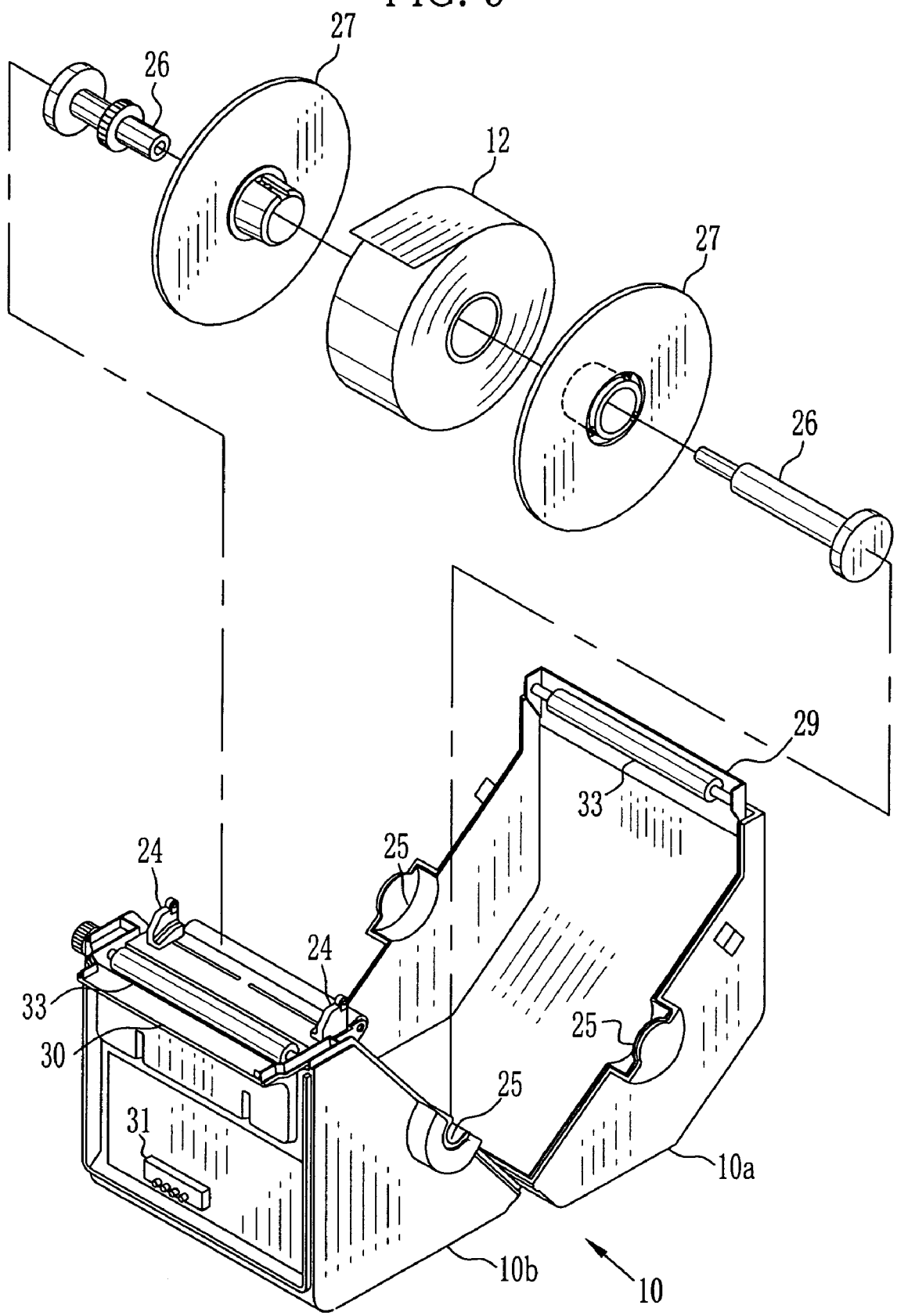
FIG. 3 is an exploded perspective view showing the magazine.

As shown in FIG. 3, the magazine 10 includes a lid body 10a and a main body 10b to be fixed to the magazine stand 20. The lid body 10a is openably attached to the main body 10b. A side wall of the magazine 10 is provided with a bearing portion 25 formed at a join portion of the lid body 10a and the main body 10b. The bearing portion 25 supports each end of a support shaft 26 of the photographic paper roll 12 so that the photographic paper roll 12 is rotatably retained in the magazine 10. The photographic paper roll 12 is held by a pair of flanges 27 and the support shaft 26. With respect to the photographic paper roll 12, plural kinds having different widths are prepared in accordance with print sizes, and are selectively used. The flange 27 is attached to an optional position of the support shaft 26 so as to fit to the width of the photographic paper roll 12 to be used. Meanwhile, by adjusting a width guide 24, the photographic paper in the magazine is guided without meandering.

An advancing roller pair 33 for advancing and rewinding the photographic paper roll 12 is built in the magazine 10. A drive transmit unit comprising a gear train for rotating the advancing roller pair is provided, although an illustration thereof is omitted. The drive transmit unit is for transmitting a rotational drive from a drive motor, which is provided on the magazine stand 20, to the advancing roller pair 33. In virtue of this, the photographic paper roll 12 is advanced and rewound.

An upper portion and a lower portion of a front side of the magazine 10 (a side confronting the magazine stand) are provided with paper mouths 29 and 30 respectively, which are formed at the connect portion of the lid body 10a and the main body 10b. Plush adheres to surfaces of the paper mouths 29 and 30. The plush shades the inside of the magazine 10 when the lid body 10a and the main body 10b are closed. As a member for shielding the light, a shutter or the like may be used.

Under the paper mouth 30 of the main body 10b, an ID chip 31 is detachably disposed. The ID chip 31 stores photographic-paper information of the photographic paper roll 12 to be contained in the magazine 10. The photographic-paper information concerns a type of the photographic paper, a width thereof, a roll length, a processing solution corresponding thereto, a manufacture lot number of emulsion, an expiration date and so forth. When the photographic-paper roll 12 is changed to another type, the ID chip 31 is also changed so as to correspond thereto. By the way, in a case a radio tag is used as the ID chip 31, contents of the ID chip 31 are rewritten when changing the photographic-paper roll 12. The ID chip 31 may be for merely distinguishing the magazine 10 instead of storing the photographic-paper information. In this case, distinction information of the ID chip 31 and the photographic-paper information corresponding thereto are written in advance in a memory of the system controller 8. The magazine stand 20 is provided with an ID-chip reader for reading the information of the ID chip 31.

Such as shown in FIG. 2, the first magazine stand 20 is constituted of a horizontal member 20a and a perpendicular member 20b combined in an L-like shape. The perpendicular member 20b is provided with a cutter 34 (see FIG. 1), an opening 20c through which the photographic paper is advanced (see FIG. 4A), and a driver for driving the advancing roller pair 33, although this driver is not shown. The advancing roller pair 33 in the magazine 10 receives a driving force from the driver to advance the photographic paper out of the photographic-paper roll 12. The advanced photographic paper is cut by the cutter 34 in accordance with the print size, and is sent to the first passage 15. The second magazine stand 21 is constituted similarly to the first magazine stand 20 and comprises the cutter 34 and the driver for driving the advancing roller pair 33. The photographic paper 13 advanced from the magazine 11 and having a length corresponding to the print size is sent to the second passage 16. Timing for supplying the photographic papers from the first and second magazine stands 20 and 21 is controlled by the system controller 8. The photographic papers are carried in an arrangement that leading edges of the photographic papers of the respective rows coincide with each other such as shown in FIG. 2. Alternatively, it is possible to carry the photographic papers in a zigzag arrangement that the leading edges of the photographic papers of the respective rows are shifted, although this arrangement is not shown. Further, it is also possible to carry the photographic papers at different advancement lengths in the same row in accordance with an aspect ratio of image data. The exposing section 4 performs the scanning exposure of an image for the respective photographic papers in synchronism with the advancement of the photographic papers.

As shown in FIG. 2, the magazine stands 20 and 21 are disposed so as to be vertically separated in the printer processor 2. The magazine stands 20 and 21 are provided with the magazine-stand positioning units 22 and 23 for fixing the magazine stands 20 and 21 to predetermined positions by sliding them in the width direction of the photographic paper. In virtue of this, the photographic papers 13 are adapted to have an optimum multi-row pitch in accordance with the width of the photographic paper 13. In this state, the photographic papers 13 are sent to the exposing section 4.

The magazine-stand positioning units 22 and 23 move the magazine stands 20 and 21. For instance, this movement is performed by belt driving, screw driving, rack and pinion driving and so forth. The magazine stand is stopped at a predetermined position on the basis of a detection signal of a sensor, which is not shown. Relationship between the stop position and the photographic-paper width is predetermined and is stored in a memory of the system controller 8. Upon inputting the information of the photographic-paper width, the magazine-stand positioning units 22 and 23 are driven on the basis of the information to set the predetermined multi-row pitch. By the way, instead of determining the position by using the sensor, a motor may be driven so as to set the predetermined position on the basis of prescribed relationship between a motor-drive amount and a slide amount.

Next, an operation of this embodiment is described below. When the width of the photographic paper roll 12 has been changed to another width, the optimum multi-row pitch is searched from the memory of the system controller 8 in accordance with the width of the photographic paper roll 12. On the basis of the searched multi-row pitch, the magazine-stand positioning units 22 and 23 are driven to set the predetermined multi-row pitch. In this way, multi-row feeding may be easily performed in accordance with the width of the photographic paper. Successively, a print-start key of the key input portion 8a is operated to start printing. The photographic papers 13 advanced from the two magazines 10 and 11 are carried in two rows and the scanning exposure is performed at the exposing section 4. After that, the processes of developing, drying and classifying are executed, and then, the photographic papers are grouped every order in the stacking section 7. In a case the photographic paper roll 12 having the width of 12 inches, which is almost feeding limit of the passage concourse 17, is used, the photographic paper roll 12 of the 12-inch width is set to the magazine 11 to perform single-row feeding. In this case, the magazine-stand positioning unit 22 is driven so as to set the center of the photographic paper to the center of the passage concourse 17, and then, the single-row feeding is performed.

In the above embodiment, is described the two-row feeding wherein two magazines 10 and 11 are set. However, the magazines and the magazine stands may be provided by three or more. In this case, it is possible to perform the multi-row feeding in accordance with the number of the magazines to be set.

In the above embodiment, the magazine-stand positioning units 22 and 23 are provided so that the multi-row pitch is automatically changed by moving the magazines 10 and 11 in the width direction of the photographic paper. Instead of this, fixed positions of the respective magazines 10 and 11 may be changed in the width direction of the photographic paper by operating a lever 35 shown in FIG. 4. In this case, slide rails 36, positioning groove members 37 and fixing rods 38 are provided instead of the magazine-stand positioning units 22 and 23. The slide rails 36 retain magazine stands 39 and 40 movably in the width direction of the photographic paper. By means of the positioning groove member 37 and the fixing rod 38, the magazine stand is positioned. The positioning groove member 37 is disposed at a lower portion of the front of the magazine stand and has a plurality of grooves 41. Positions of the grooves 41 are determined in accordance with kinds of the photographic papers to be contained in the magazines and a combination of the various photographic papers. Groove numbers 42 for setting the magazine stands 39 and 40 to the determined positions are marked on the magazine stands 39 and 40.

The fixing rod 38 comprising a shaft 43, the lever 35 and a projection 45 is rotatably attached to a frame of the main body. The fixing rod 38 is rotated by operating the lever 35 to move between a fixation position where the projection 45 engages with the groove 41, and an evacuation position where the projection 45 disengages from the groove 41.

Figure 4A:
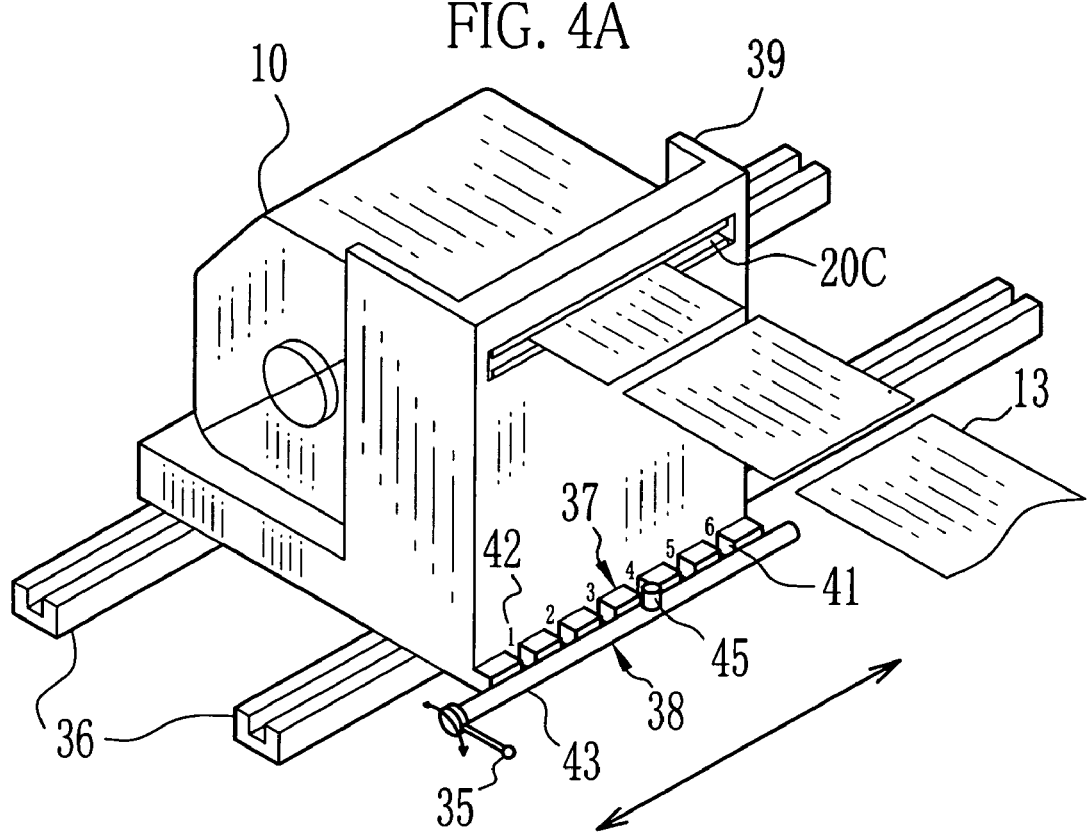
FIGS. 4A and 4B are perspective views showing a position regulator provided on the magazine stand.
Figure 4B:
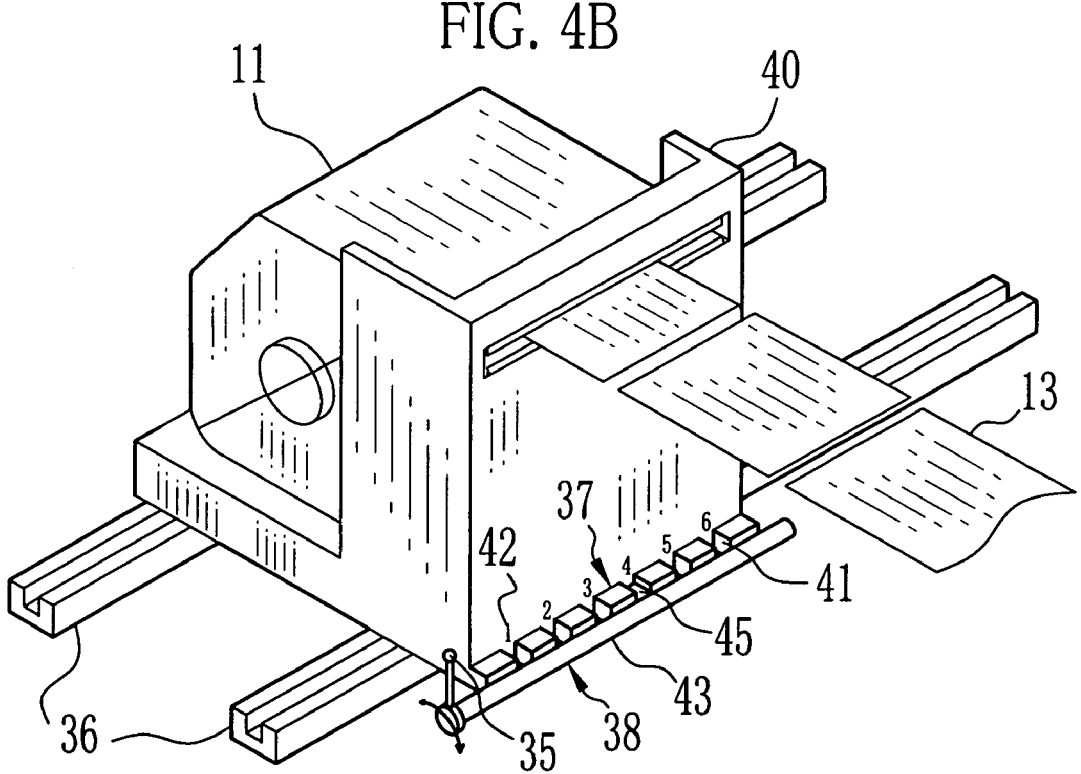

When sliding the magazine stands 39 and 40, the lever 35 is operated to set the projection 45 to the evacuation position, such as shown in FIG. 4A. Meanwhile, when positioning and fixing the magazine stands 39 and 40 after sliding, the fixing rod 38 is rotated by operating the lever 35 to engage the projection 45 with the predetermined groove 41. By properly selecting the groove 41 for engaging with the projection 45, the multi-row feeding of the photographic papers 13 advanced from the magazines 10 and 11 is performed at adequate positions on the passage concourse 17.

The respective grooves 41 are provided with sensors, although an illustration thereof is omitted. This sensor detects the projection 45. Upon engaging the projection 45 with the groove 41 after sliding the magazine stands 39 and 40 to the predetermined positions, information of the magazine position detected by the sensor is sent to the system controller 8.

The system controller 8 includes a judging portion 8d for judging whether or not the magazine stands 39 and 40 are fixed to the predetermined positions. The judging portion 8d makes the judgment on the basis of the information concerning the photographic paper and the magazine position. The information of the photographic paper is sent from the ID chip 31 attached to each of the magazines 10 and 11. The information of the magazine position is sent from the sensor. Since the respective magazines 10 and 11 are fixed by engaging the projection 45 with the predetermined groove 41, which corresponds to the combination and the kind of the photographic papers, it is possible to place the photographic paper 13 at a proper feeding position when the multi-row feeding is performed. Even if the single-row feeding is performed by using only one of the magazines, it is possible to place the photographic paper 13 at a proper feeding position.

By the way, in case the projection 45 engages with the groove 41 different from that of the predetermined position, the judging portion 8d judges, from the information concerning the magazine position and the photographic paper, that the magazine stands 39 and 40 are not fixed to the predetermined positions. In this case, the judging portion 8d outputs a warning signal to the alarm 8c for giving a caution. Further, the display 8b shows a notice of the wrong-position setting and indicates the groove number 42 of the right position. In virtue of this, the photographic papers 13 are prevented from overlapping with each other on the passage concourse 17. Also, the photographic paper of broad width is prevented from protruding out of the passage and from disturbing internal parts of the printer. It is possible to perform proper exposure and development in the multi-row feeding. Incidentally, instead of indicating the groove number 42, LEDs and so forth may be individually arranged at positions corresponding to the respective grooves. By luminously indicating the corresponding groove position, the right position may be notified to an operator.

In the forgoing embodiments, the magazine stands are slid to perform the multi-row feeding so that it is possible to use the sole kind of the magazine as it is. This magazine is adapted to contain the photographic paper of the maximum width to be processed by the photosensitive-material processing apparatus. Further, complicated mechanisms for arranging the photographic papers in multi rows and for rearranging them in an original exposure order are not required. Thus, it is possible to perform the multi-row feeding at small cost.

Figure 5:
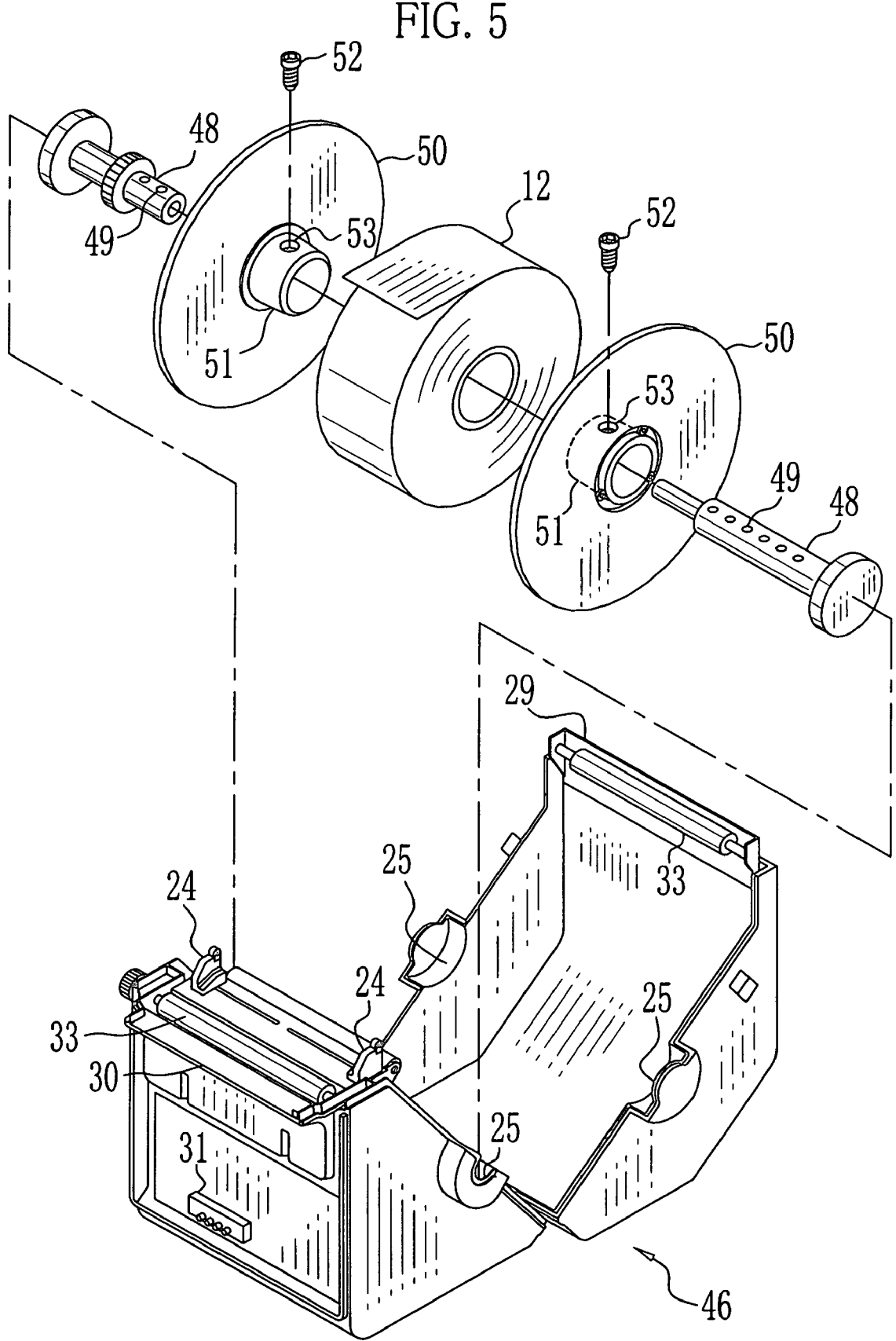
FIG. 5 is an exploded perspective view showing the magazine in which a position for fixing a flange is changeable.

In the forgoing embodiments, the magazine stands 20, 21, 39 and 40 are moved in the width direction of the photographic paper to change the multi-row pitch. Alternatively, the multi-row pitch may be changed by shifting a photographic-paper-roll fixing position in a magazine 46, such as shown in FIG. 5. In this case, a position for fixing a flange 50 to a support shaft 48 is altered. The support shaft 48 is provided with holes 49 formed at predetermined intervals in a longitudinal direction. A boss 51 of the flange 50 is provided with a screw hole 53 and a screw 52 for fixing the flange 50 to the support shaft 48. The screw 52 is fitted into the hole 49 formed in the support shaft 48. In accordance with this, positions of the width guides 24 are changed inside the magazine. Although FIG. 5 shows the magazine 46, another magazine 47 (see FIG. 6) is similarly constituted. By the way, in a case the photographic paper roll 12 is fixed to the support shaft 48 in an offset manner relative to the center of the magazine 46, it is preferable to make the right-and-left bearing portions differ in its shape and in its size for the purpose of preventing the support shaft 48 from being attached to the bearing portions 25 in a reverse direction.

At the time of usage, a user fits the screw 52 of the flange 50 into the hole 49 of the predetermined position in accordance with the combination and the kinds of the photographic paper rolls 12 to be contained in the magazines 46 and 47. For instance, the photographic paper roll 12 contained in the magazine 46 is moved along the support shaft 48 toward a background side in the drawing and is fixed. In contrast, the photographic paper roll 12 contained in the magazine 47 is moved along the support shaft 48 toward a foreground side in the drawing and is fixed. Accordingly, the photographic papers 13 carried to the passage concourse 17 through the first and second passages 15 and 16 are prevented from overlapping on the passage concourse 17 and are arranged at proper feed positions to perform the multi-row feeding.

As described above, in this embodiment, only the photographic paper roll 12 and the flanges 50 are moved along the support shaft 48 without moving magazine stands 54 and 55 so that its structure is simplified. By the way, a fixing pin may be used for fixation instead of the screw. Further, instead of the fixation utilizing the screw and the pin, the support shaft 48 may be provided with a flange shifting mechanism to automatically change a photographic-paper-roll position by an external operation, although an illustration thereof is omitted. In this case, it is possible to modify the structure by exchanging internal parts of the magazines 46 and 47 so that the multi-row feeding may be performed at small cost.

Figure 7:
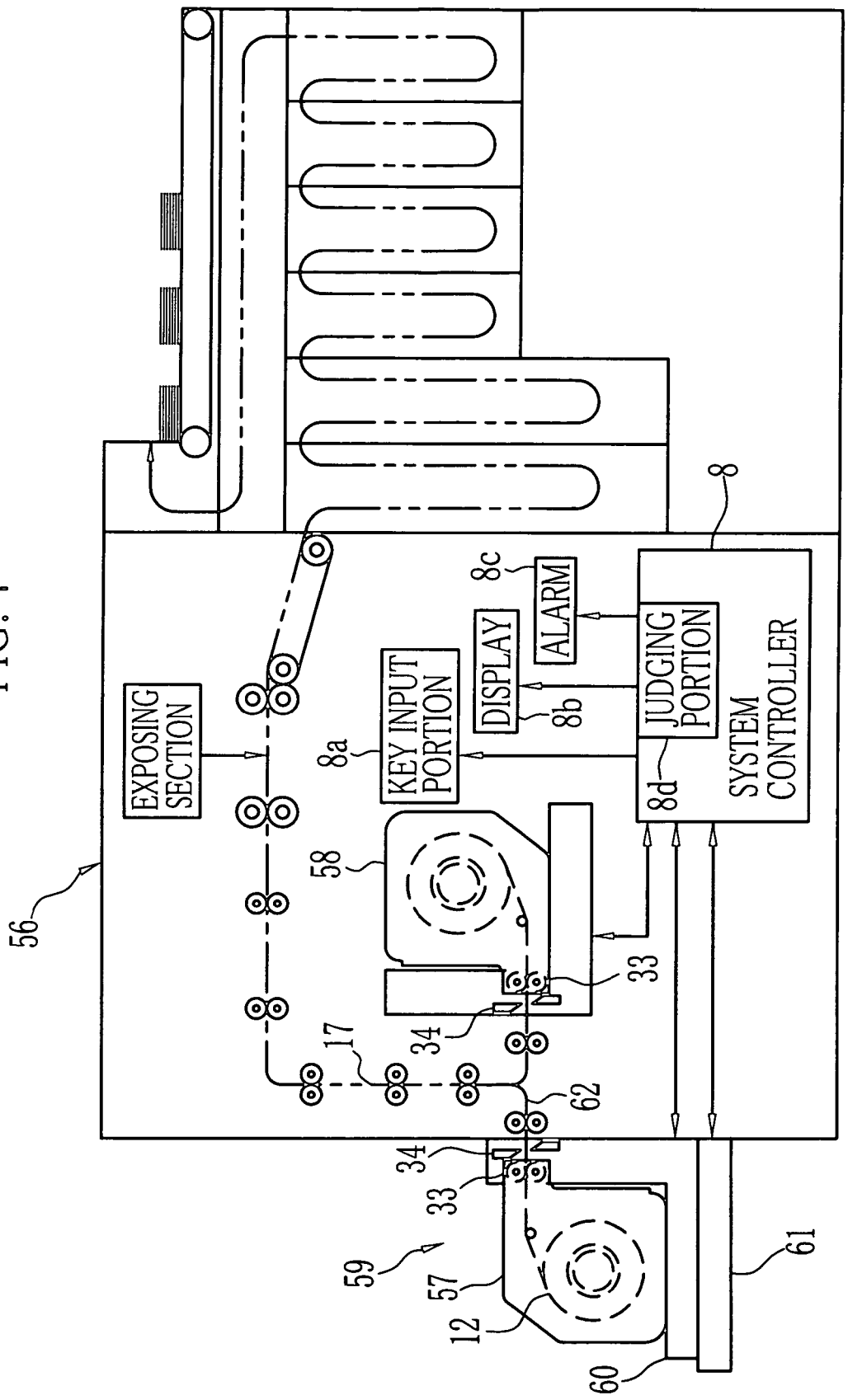
FIG. 7 is a schematic illustration showing a printer processor having an additional magazine.

The other embodiment according to the present invention is described below. In this embodiment, a magazine 57 is added to an existing printer processor 56, such as shown in FIG. 7. Incidentally, components being identical with those of the forgoing embodiments are denoted by the same reference numerals, and duplicate description thereof is abbreviated. The printer processor 56 is of a type in which a single magazine 58 is built in. A supplying section 59, which is similar to that shown in FIG. 2, is externally added to the printer processor 56. The supplying section 59 is constructed similarly to that of FIG. 2 and is constituted of an additional magazine stand 60, a magazine-stand positioning unit 61, a second passage 62, and the passage concourse 17. As the built-in magazine 58, the magazine shown in FIG. 5 is used. In this magazine 58, the position of the photographic paper roll is changeable. Thus, it is possible to optionally change the photographic-paper supplying positions of the magazines 57 and 58 so that the multi-row feeding may be easily performed. In the meantime, a plurality of the additional magazine stands 60 may be used. In this case, the additional magazines contain the photographic papers of narrow width to perform the multi-row feeding, and the built-in magazine contains the photographic paper of broad width to perform the single-row feeding. Alternatively, it is considered as another embodiment that the sole additional magazine and the built-in magazine contain the photographic papers of narrow width to perform the multi-row feeding and the other additional magazine contains the photographic paper of broad width to perform the single-row feeding.

In the forgoing embodiments, the two-row feeding using two magazines is described as an example. Besides this, multi-row feeding of three or more rows using three or more magazines may be performed. In the forgoing embodiments, each of the magazines is provided with the advancing roller pair 33 and the cutter 34. Thus, it is possible to change the advancement length of the photographic paper every magazine so that it is possible to perform the multi-row feeding of the photographic papers having different advancement lengths. Of course, it is also considered that the respective magazines contain the photographic paper of different width to perform the multi-row feeding.

Figure 6:
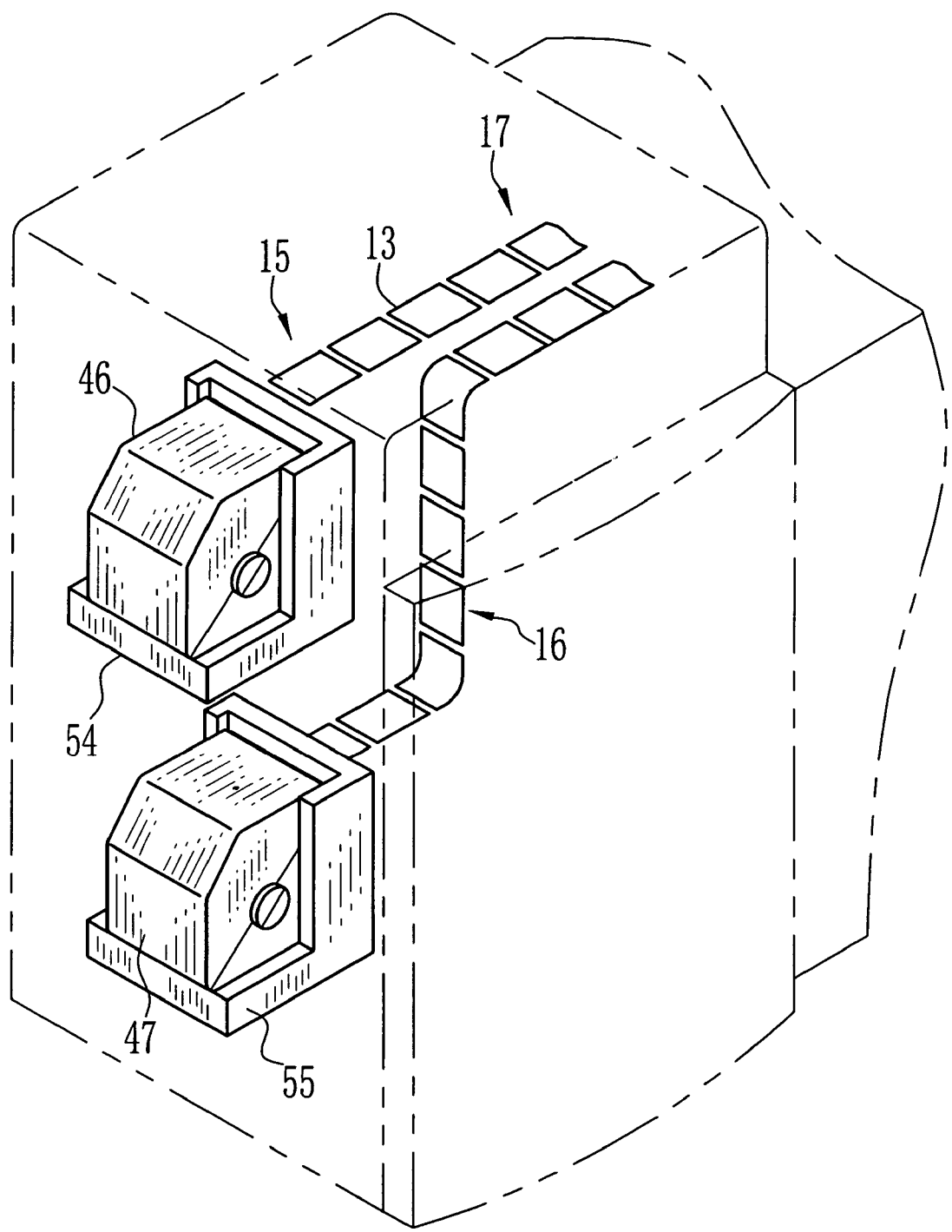
FIG. 6 is a perspective view showing arrangement of the magazines in which the flange-fixing position is changeable.

In the forgoing embodiments, the magazine-moving manner shown in FIGS. 1–4 and the photographic-paper-roll moving manner shown in FIGS. 5–6 are individually used. However, these manners may be used together.

In the forgoing embodiments, the magazine containing the recording material of the roll type is described. However, in a case of a magazine in which recording materials of a cut-sheet type are stacked and contained, it is also possible to perform printing of multi-row feeding by similarly changing a position in a width direction of the recording material. Meanwhile, the forgoing embodiments relate to a silver photographic printer. This recoding method, however, is not exclusive. It is possible to adopt an ink-jet recording method, a thermal recording method, and the other recording methods.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A supplying apparatus for a recording material including:
    a plurality of magazines respectively containing a recording paper roll in which said recording material is taken up;
    conveyor for conveying the respective recording materials, which are drawn out of the respective magazines, toward a print position along passages; and
    positioner for determining set positions of the magazines or the recording materials of the magazines in a width direction, which is perpendicular to a carrying direction of said recording materials, such that the respective recording materials on said passages are prevented from interfering with each other in said width direction, wherein said positioner comprises:
    a magazine stand for holding said magazine, said magazine stand being movable in said width direction; and
    a fixer for fixing said magazine stand to a predetermined position in said width direction.

2. A supplying apparatus for a recording material according to claim 1, further including a plurality of cutters provided so as to correspond to the respective magazines, said cutter cutting said recording material, which is drawn out of said magazine, in a predetermined length to forward it to said passage as a recording sheet.

3. A supplying apparatus for a recording material according to claim 2, wherein said conveyor comprises a plurality of conveyor rollers disposed along said passages to carry said recording sheet.

4. A supplying apparatus for a recording material according to claim 3, wherein said magazine includes:
    a magazine body;
    a lid openably attached to said magazine body;
    a core shaft for retaining said recording paper roll, said core shaft being attached to said magazine body so as to make said recording paper roll rotatable inside said magazine; and
    a pair of flanges for positioning both sides of said recording paper roll on said core shaft, said flange having a boss slidably fitting to said core shaft.

5. A supplying apparatus for a recording material according to claim 4, wherein said positioner is a flange fixer for attaching said pair of the flanges to prescribed positions on said core shaft.

6. A supplying apparatus for a recording material according to claim 5, wherein said flange fixer comprises a plurality of holes formed in said core shaft along an axial direction, and a fixation screw tightened into said boss of the respective flanges, the top of said fixation screw fitting into one of said holes.

7. A supplying apparatus for a recording material according to claim 3, further comprising:
    judgment unit for judging whether or not the respective recording materials advanced from the respective magazines interfere with each other inside said passage.

8. A supplying apparatus for a recording material according to claim 7, wherein said judgment unit judges interference of said recording material by judging whether or not said magazines are fixed at the predetermined positions, depending on positions of said magazines and width information of said recording material.

9. A supplying apparatus for a recording material according to claim 8, further comprising:
    warning unit for announcing a trouble when said judgment unit has judged the interference of said recording material.

10. A supplying apparatus for a recording material according to claim 9, further comprising:
    a display for indicating the trouble when said judgment unit has judged the interference of said recording material.

11. A supplying apparatus for a recording material according to claim 3, wherein said magazine stand substantially has an L-figure shape comprising a horizontal member and a perpendicular member, said magazine being placed on said horizontal member and said perpendicular member being provided with said cutter and an opening through which said recording material passes.

12. A supplying apparatus for a recording material according to claim 11, further including a slid rail on which said magazine stand is slidably placed.

13. A supplying apparatus for a recording material according to claim 12, wherein said positioner includes:
    a plurality of grooves provided on said horizontal member of said magazine stand;
    a projection being able to engage with the opposite one of said grooves;
    a rotational rod provided with said projection, said rod being rotated to engage said projection with said groove so that said magazine stand is positioned at a specific position in said width direction.

14. A supplying apparatus for a recording material according to claim 13, wherein said rod is provided with a lever to be manually operated.

* * * * *